United States Patent
Gardes et al.

(10) Patent No.: US 8,167,238 B2
(45) Date of Patent: May 1, 2012

(54) PYLON CAISSON ATTACHMENT ON A WING, GRIPPING A LATERAL PANEL OF THE CAISSON

(75) Inventors: Pascal Gardes, Lherm (FR); Stephane Combes, Buzet sur Tarn (FR)

(73) Assignee: Airbus Operations, Toulouse (FR)

( * ) Notice: Subject to any disclaimer, the term of this patent is extended or adjusted under 35 U.S.C. 154(b) by 399 days.

(21) Appl. No.: 12/596,784

(22) PCT Filed: Apr. 22, 2008

(86) PCT No.: PCT/EP2008/054838
§ 371 (c)(1),
(2), (4) Date: Oct. 20, 2009

(87) PCT Pub. No.: WO2008/129042
PCT Pub. Date: Oct. 30, 2008

(65) Prior Publication Data
US 2010/0090056 A1  Apr. 15, 2010

(30) Foreign Application Priority Data
Apr. 23, 2007 (FR) ...................................... 07 54636

(51) Int. Cl.
*B64D 27/00* (2006.01)

(52) U.S. Cl. .......................................... 244/54; 60/797

(58) Field of Classification Search ..................... 244/54; 248/554, 555, 556, 557; 60/796, 797
See application file for complete search history.

(56) References Cited

U.S. PATENT DOCUMENTS

| | | | |
|---|---|---|---|
| 6,095,456 A | 8/2000 | Powell | |
| 2005/0116093 A1 | 6/2005 | Machado et al. | |
| 2005/0151008 A1 | 7/2005 | Machado et al. | |
| 2009/0108127 A1* | 4/2009 | Cazals | 244/54 |

FOREIGN PATENT DOCUMENTS

| | | |
|---|---|---|
| EP | 1 535 837 | 6/2005 |
| EP | 1 538 080 | 6/2005 |
| FR | 2 878 229 | 5/2006 |

* cited by examiner

*Primary Examiner* — Tien Dinh
*Assistant Examiner* — Michael A Fabula
(74) *Attorney, Agent, or Firm* — Oblon, Spivak, McClelland, Maier & Neustadt, L.L.P.

(57) ABSTRACT

An aircraft assembly including a wing element and an attachment pylon of a turboengine, including a rigid structure forming a caisson defined externally by a first longeron, a second longeron, and two lateral panels. The assembly also includes an attachment mechanism of the structure on the wing element, fitted with two front attachments, each including two first fittings solid with the associated lateral panel. For each front attachment, the two first fittings are arranged respectively on either side of their associated lateral panel.

9 Claims, 3 Drawing Sheets

PYLON CAISSON ATTACHMENT ON A WING, GRIPPING A LATERAL PANEL OF THE CAISSON

TECHNICAL FIELD

The present invention relates in general to an aircraft assembly comprising a wing element forming a caisson and an attachment pylon of a turboengine on said wing element.

The invention can be used on any type of aircraft equipped for example with turbojet engines or of turboprop engines.

This type of attachment pylon, also known as "EMS" (for "Engine Mounting Structure"), for example suspends a turboengine below the wing of the aircraft, or else mounts this turboengine above this same wing.

PRIOR ART

Such an attachment pylon is in fact provided to constitute the linkage interface between an engine such as a turbojet engine and a wing of the aircraft. It transmits to the structure of this aircraft the forces generated by its associated turbojet engine, and also allows flow of fuel, electrical systems, hydraulics, and air between the engine and the aircraft.

To ensure transmission of forces, the pylon comprises a rigid structure, often of the "caisson" type, that is, formed by assembling the upper and lower longerons and two lateral panels connected together by means of transversal grooves.

On the other hand, the pylon is fitted with an engine-mounting system interposed between the turbojet engine and the rigid structure of the pylon, this system comprising overall at least two engine attachments, generally a front attachment and a rear attachment.

Also, the assembly system comprises a thrust force collection device generated by the turbojet engine. In the prior art, this device for example takes the form of two lateral connecting rods connected on the one hand to a rear part of the fan casing of the turbojet engine, and on the other hand to the rear engine attachment fixed on the casing of the latter.

In the same way, the attachment pylon also comprises a second assembly system interposed between the rigid structure of this pylon and the wing of the aircraft, this second system usually being composed of several attachments.

Finally, the pylon is provided with a secondary structure ensuring segregation and maintenance of systems while supporting aerodynamic faring.

In the embodiments of the prior art, the second assembly system interposed between the rigid structure of the pylon and the wing of the aircraft usually comprises two front attachments, a rear attachment, and an intermediate attachment especially intended to take up the thrust forces generated by the associated turboengine. This intermediate attachment is for example of the "spigot" type, that is, embodied by a ball joint fixed in the upper longeron of the rigid structure, between the front attachment and the rear attachment, and further comprising an axis or shearing plug fixed under the wing of the aircraft by means of an embedding fitting, to be able to be housed in the abovementioned ball joint.

The two front attachments, of identical or similar design and spaced laterally from one another, cooperate respectively with the two lateral panels of the attachment pylon, in the sense that they each comprise two superposed first fittings, solid with the associated lateral panel. Also, each front attachment comprises at least one second fitting solid with the wing element, and shackles articulated at one of their ends on the second fitting, and articulated at the other end on the two abovementioned first fittings. By way of indication, it is noted that the two first superposed fittings of each front attachment are located inside the caisson, by being covered by their associated lateral panel.

Due to the still more considerable size of the turboengines carried by the attachment pylons, the forces having to transit between a pylon and its corresponding wing element also become increasingly consequential, in particular with respect to the vertical forces associated with absorbing torque exerted according to a longitudinal axis of the pylon. In this respect, it is noted that the increase in lateral distance of the two front attachments constitutes a solution reducing the forces transiting in each of these front attachments for absorbing the torque exerted according to the longitudinal axis of the pylon. However, due to the position of the first fittings on the pylon, this increase in distance inevitably leads to an increase in the width of the caisson, therefore to generation of aerodynamic perturbation penalising the overall efficiency of the aircraft.

OBJECT OF THE INVENTION

The aim of the invention is therefore to propose an aircraft assembly at least partially rectifying the disadvantages mentioned hereinabove, relative to embodiments of the prior art.

For this to happen, the object of the invention is an aircraft assembly comprising a wing element forming a caisson and an attachment pylon of a turboengine on said wing element, the attachment pylon comprising a rigid structure forming a caisson defined externally by a first longeron, a second longeron, and two lateral panels arranged on either side of said first and second longerons, the assembly also being provided with attachment means of said rigid structure on the wing element, the attachment means being fitted with two front attachments cooperating respectively with said two lateral panels, each front attachment comprising two first fittings solid with the associated lateral panel, at least one second fitting solid with the wing element, and shackles articulated at one of their ends on said second fitting and articulated at the other end on said two first fittings. According to the invention, for each front attachment, said two first fittings are arranged respectively on either side of their associated lateral panel.

So, by placing one of the two first front attachment fittings externally relative to the associated lateral panel, and therefore externally relative to the caisson, the advantageous result is an increase in the lateral distance of the two front attachments, without as such generating an increase in the width of this caisson. As a consequence, the original solution retained ensures absorbing of the substantial forces transiting between the pylon and its corresponding wing element, and in particular that of the vertical forces associated with absorbing the torque exerted according to the longitudinal axis of the pylon, without generating aerodynamic penalties. Also, the increase of the pitch centre between the two front attachments also reduces the sizing of these attachments before absorbing less substantial forces, advantageously resulting in a significant mass gain.

Also, the two first fittings of each front attachment, gripping the associated lateral panel, take the latter in double shear, for better passage of forces in the direction of the wing element.

Finally, for each front attachment, the fact of providing two first fittings ensures the so-called "Fail Safe" function of transmission of forces towards the wing element, since in case of failure occurring on one of the two first fittings, the forces can then transit via the other of these first fittings.

For each front attachment, said two first fittings preferably constitute respectively a first internal fitting and a first external fitting, these two fittings constituting with the associated lateral panel an assembly of superposed elements, preferably in contact in pairs for better compactness.

Said first longeron of the rigid structure forming a caisson is preferably arranged between the two first internal fittings belonging respectively to the two front attachments, and extends from a single piece towards the front and towards the rear from said two front attachments. In this respect, it is noted that if the first longeron is preferably provided, as just mentioned, to extend from a single piece on either side of the two front attachments according to the longitudinal direction, it extends even more preferably from a single piece over the entire length of the caisson. However, more generally, it is provided that it is made monobloc, or else by assembling linking sections, which can optionally be slightly inclined relative to each other. However, in this latter case, it is preferably always ensured that part of this longeron extends from a single piece over a portion of the length of the caisson towards the front and towards the rear from the two front attachments. This enables better continuity in absorbing forces by the caisson, at the level of the two front attachments.

Said first longeron of the rigid structure forming a caisson preferably has two lateral reinforcements for housing respectively said two first internal fittings. In such case, the reinforcements are advantageously of limited depth, given each of them houses one only of the two first fittings of the associated front attachment.

For each front attachment the first internal fitting is preferably housed between its associated lateral panel and an internal transversal groove belonging to the rigid structure forming a caisson.

More preferably, for each front attachment, said second fitting is solid with a front longeron of the wing element.

The attachment means preferably also comprise an intermediate attachment and a rear attachment, even if an embodiment in which no intermediate attachment were provided could be envisaged, without departing from the scope of the invention.

In the preferred case where the pylon is intended to ensure suspension of the engine under the wing of the aircraft, a case where the pylon is therefore also located under the wing element, said first longeron constitutes an upper longeron of said caisson. In the other case where the pylon is intended to carry the engine above the wing of the aircraft, the first longeron constitutes a lower longeron of the caisson.

Another object of the invention is an aircraft comprising at least one assembly such as described hereinabove.

Other advantages and characteristics of the invention will emerge from the following detailed non-limiting description.

BRIEF DESCRIPTION OF THE DRAWINGS

This description will be given with respect to the attached drawings, in which.

DETAILED DESCRIPTION OF PREFERRED EMBODIMENTS

Figure 1:
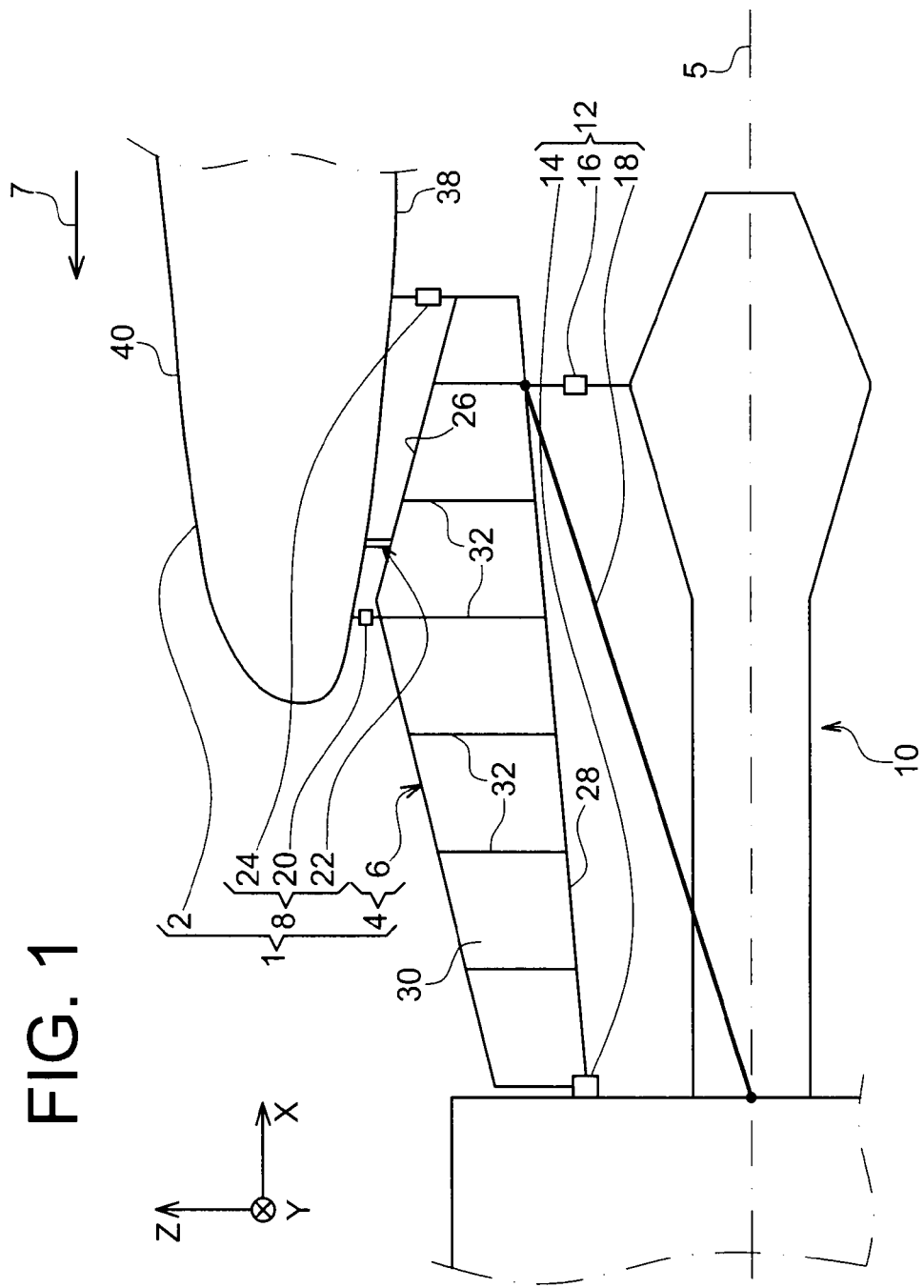
FIG. 1 illustrates a partially schematic side view of an aircraft engine assembly according to a preferred embodiment of the present invention.

In reference to FIG. 1, this shows an aircraft assembly 1 according to a preferred embodiment of the present invention.

This assembly 1 overall comprises a wing element 2 such as a wing, an attachment pylon 4 of a turboengine such as a turbojet, and attachment means 8 of a rigid structure 6 forming a caisson of the pylon 4, under the wing element 2.

Also, by way of indication FIG. 1 illustrates attachment means 12 interposed between the rigid structure 6 and the turboengine 10, these means 12 being constituted by one or more front engine attachments 14, a rear engine attachment 16, and a thrust force collection device 18 essentially fitted with lateral takeup connecting rods.

These attachment means 12 are produced by conventional means, and accordingly require no further description.

Throughout the following description, conventionally, X is the longitudinal direction of the pylon 4 which is also equivalent to the longitudinal direction of the turbojet 10, this direction X being parallel to a longitudinal axis 5 of this turbojet 10. On the other hand, Y is the direction oriented transversally relative to the pylon 4 and also equivalent to the transversal direction of the turbojet 10, and Z the vertical direction or of the height, these three directions X, Y and Z being orthogonal to one another.

On the other hand, the terms "front" and "rear" are to be considered relative to a direction of advance of the aircraft encountered following the thrust exerted by the turbojets 10, this direction being illustrated schematically by the arrow 7.

Still in reference to FIG. 1, it is evident that only the rigid structure forming a caisson 6 of the attachment pylon 4 has been shown, accompanied by attachment means 8 of this rigid structure under the wing element 2. The other integral elements of this pylon 4, not shown, of secondary structure type ensuring segregation and maintenance of systems while supporting aerodynamic faring, are classic elements identical or similar to those found in the prior art, and known to the expert. As a consequence, no detailed description will be given.

In the same way, it is indicated that the rigid structure 6 can overall be similar to those encountered in the devices of the prior art. Still in reference to FIG. 1, it is evident that this structure 6 has the form of a caisson extending in the direction X, this caisson also being called torsion caisson. It is conventionally formed by an upper longeron 26 and a lower longeron 28, and by two lateral panels 30 (only one shown in FIG. 1) both extending according to the direction X and substantially in a plane XZ. Inside this caisson, transversal grooves 32 arranged according to planes YZ and longitudinally spaced reinforce the rigidity of the caisson. It is noted by way of indication that the elements 26, 28 and 30 can each be made monobloc, or else by assembling linking sections, which can optionally be slightly inclined relative to each other.

However, the attachment means 8, located overall on the part rear of the rigid structure 6, are specific to the present invention and will therefore be presented in detail hereinbelow.

In general, the attachment means 8 are constituted by two front attachments 20, an intermediate attachment and a rear attachment 24, the intermediate attachment 22 being placed between the front and rear 20, 24 attachments, but preferably arranged near the front attachment 20. As will be shown in detail hereinbelow, the two front attachments 20, offset transversally to one another, connect the upper longeron 26 of the rigid structure or caisson 6 to a front horizontal longeron forming an integral part of the wing element forming a caisson, this longeron (not shown in FIG. 1 and bearing reference numeral 34 in FIG. 2) extending substantially according to a principal longitudinal direction of this wing 2. The intermediate attachment 22 as such also connects the upper longeron 26 of the caisson 6 to the front horizontal longeron 34 of the wing 2, whereas the rear attachment 24 connects a rear end of the upper longeron 26 of the caisson 6 to the wing element 2.

Here, too, it is noted that the wing element 2 is of the type known to the expert, that is, taking the form of a caisson constituted by the assembly of longerons and grooves defining closed framework by an intrados coating 38 and an extrados coating 40.

With the attachment means 8 preferably designed to be of isostatic nature, the forces exerted according to the longitudinal direction X are absorbed exclusively by the intermediate attachment 22, the forces exerted according to the transversal direction Y are absorbed conjointly by the intermediate attachment 22 and the rear attachment 24, and the forces exerted according to the vertical direction Z are absorbed conjointly by the front attachments 20 and the rear attachment 24.

On the other hand, absorbing the torque exerted according to the direction X is ensured vertically solely by the two front attachments 20, whereas absorbing torque exerted according to the direction Y is ensured vertically conjointly by the front 20 and rear 24 attachments. Finally, absorbing the torque exerted according to the direction Z is ensured transversally by the intermediate attachment 22 and the rear attachment 24.

Figure 2:
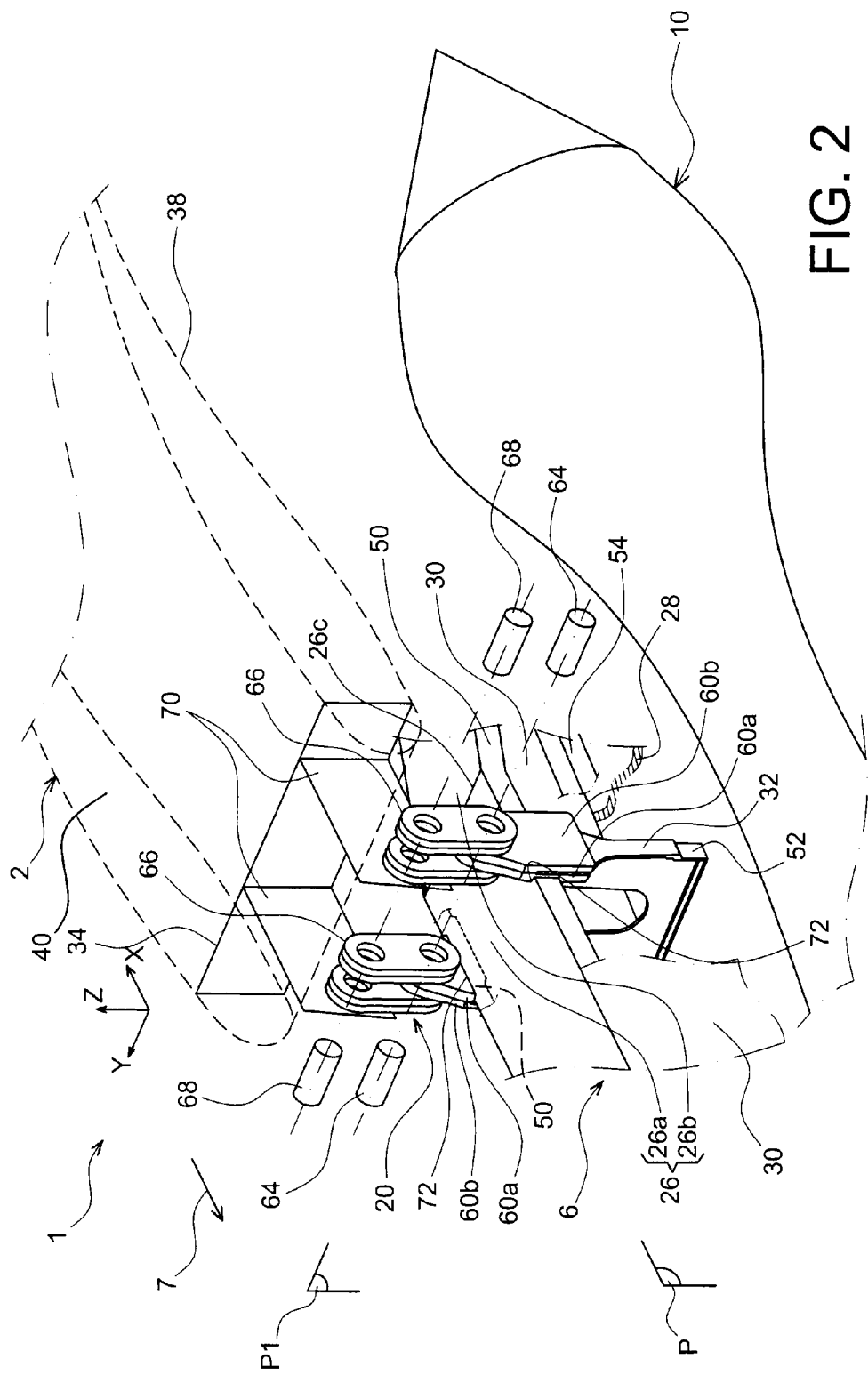
FIG. 2 illustrates a partial perspective view of the aircraft assembly shown in FIG. 1.
Figure 3:
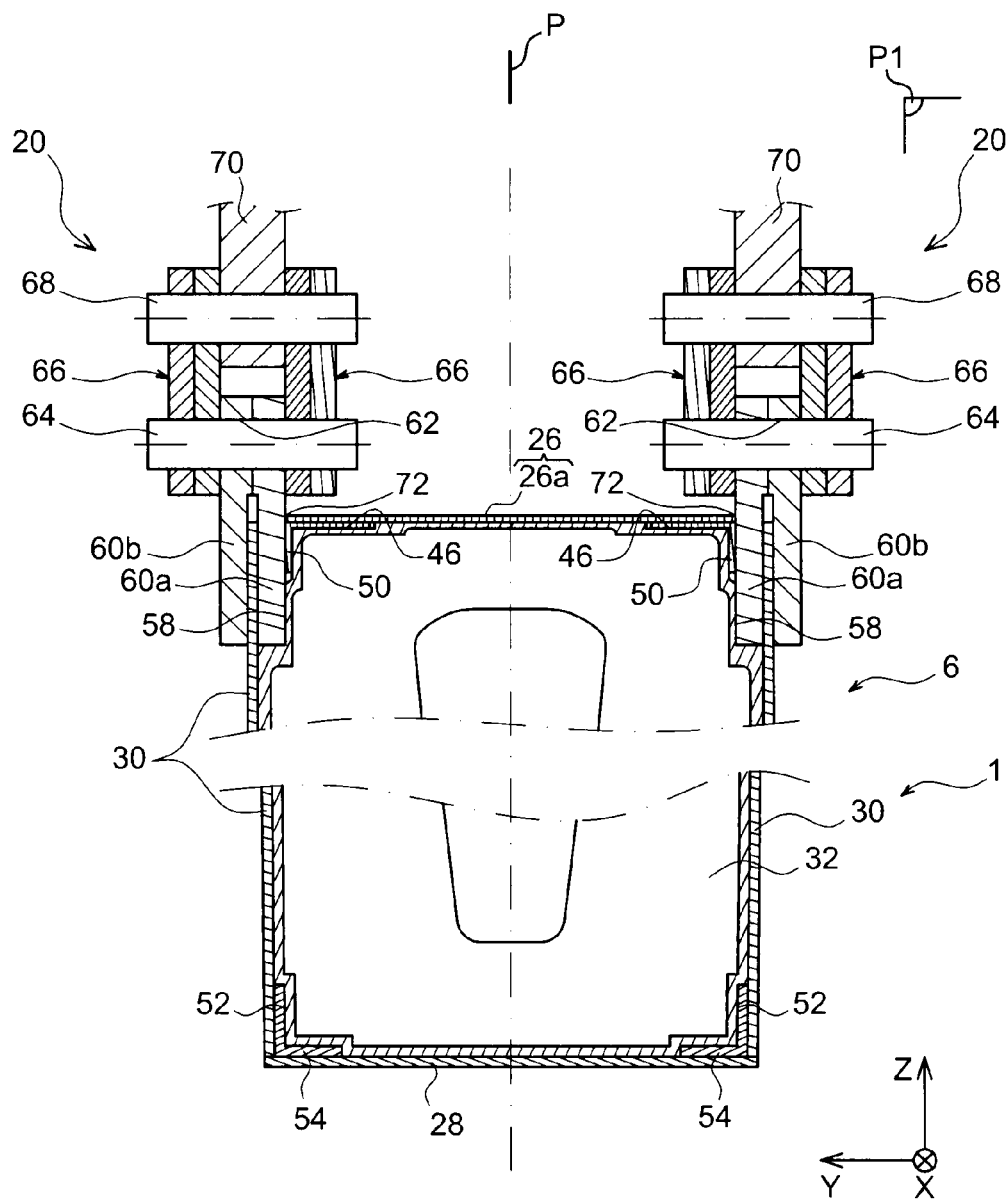
FIG. 3 illustrates a sectional view passing through the plane P1 of FIG. 2.

In reference to FIGS. 2 and 3, it is evident that the rigid structure forming a caisson 6 comprises a transversal groove 32 whereof one of the functions is formation of a fixing support for the front attachments 20. This groove 32 largely takes the form of a rectangle, partially recessed at its centre. At the level of each of its corners, it has a recess in the form of a square for housing support angles of longerons 26, 28 and lateral panels 30. More precisely, in its upper part the caisson comprises two reinforcements in the form of a square 46, each housing an upper angle 50 extending substantially according to the direction X, preferably from one end to the other of the caisson 6. In the same way, in its lower part the caisson comprises two reinforcements in the form of a square 52, each housing a lower angle 54 extending substantially according to the direction X, preferably from one end to the other of the caisson 6.

At the level of this lower part of the caisson, the lateral flank of each angle 54 is located in the continuity of a lateral flank of the groove 32, such that they conjointly constitute the same support surface for the associated lateral panel 30, substantially oriented according to a plane XZ. Similarly, the lower flank of each angle 54 is located in the continuity of a lower flank of the groove 32, such that they conjointly constitute the same support surface for the lower longeron 28, substantially oriented according to a plane XY.

At the level of the upper part of the caisson, the proposed arrangement differs substantially from that encountered in the lower part, as it integrates placing the front attachments 20.

However, the upper flank of each angle 50 is also located in the continuity of an upper flank of the groove 32, such that they conjointly constitute the same support surface for the upper longeron 26, substantially oriented according to a plane XY.

On the contrary, the lateral flank of each angle 50 is located in the continuity of another reinforcement 58 of the groove 32, such that they conjointly constitute the same support surface for fitting of the corresponding front attachment 20, substantially oriented according to a plane XZ and therefore offset towards the interior relative to the lateral flank of the groove.

One of the two front attachments 20 will now be described, given that the other is preferably substantially identical or similar. More precisely, the two attachments 20 are substantially symmetrical relative to a plane P oriented according to the directions X and Z, this plane P also constituting a plane of symmetry for the assembly of the caisson 6.

First, the front attachment 20 comprises two first fittings 60a, 60b, serving to connect to the caisson 6. Of these fittings there is a first internal fitting 60a in contact with the surface defined conjointly by the reinforcement 58 and the lateral flank of the associated upper angle 50. The outer lateral surface of the fitting 60a is located in the continuity of the lateral flank of the groove 32, such that they conjointly constitute the same support surface for the associated lateral panel 30, substantially oriented according to a plane XZ. So, the outer lateral surface of the fitting 60a is located in the same plane as that of the lateral flank of the lower angle 54.

A first external fitting 60b is provided to be plated against the associated lateral panel 30, externally relative to the latter. It is located substantially opposite the first internal fitting 60a, although being separated therefrom by the panel 30 which they take conjointly in double shear. Thus, as better seen in FIG. 3, the elements 60a, 30, 60b are substantially plane, oriented according to the directions X and Z, and stacked according to the direction Y by preferably being in contact in pairs.

The two first fittings 60a, 60b gripping the panel 30 have an upper end projecting up from the caisson, and defining a transversal orifice 62 penetrated by an axis 64. This axis 64, oriented transversally and for example taking the form of a double axis, also passes through the lower end of vertical shackles 66, also called connecting rods. The articulated shackles 66 are preferably arranged on either side of the assembly formed by the two first fittings 60a, 60b, as in FIG. 3.

The upper ends of the two first fittings 60a, 60b are preferably in contact, while their lower ends are necessarily spaced apart to jointly house the associated lateral panel 30, for gripping the latter. In this respect, it would be alternatively possible to provide the two fittings 60a, 60b in the form of a monobloc piece, of the clevis type oriented downwards.

Another axis 68, also oriented transversally and taking for example the form of a double axis, passes through the upper end of the vertical shackles 66, and a second fitting 70 oriented according to a plane XZ and connected fixed on the front longeron 34 of the wing. This second fitting 70, housed in the wing caisson, is arranged between the shackles 66 passing through the intrados coating 38.

Still in reference to FIGS. 2 and 3 in which the intermediate and rear attachments have not been illustrated, it is evident that the upper longeron 26 divides for example into two portions 26a, 26b inclined slightly relative to the other, connected fixed to one another at the level of the a junction 26c forming a caisson angle.

However, at the level of the front attachments 20 offset towards the front relative to this junction 26c, the portion 26a situated between the two first internal fittings 60a extends from a single piece towards the front and towards the rear from these two front attachments 20, for better continuity in absorbing forces. So, the portion 26a extends from a single piece between the front end of the caisson and the junction 26c forming a caisson angle, situated to the rear relative to the front attachments 20.

Also, for housing each of the two first internal fittings 60a, the portion of upper longeron 26a has on either side of the latter two lateral reinforcements 72, of a depth substantially identical to the thickness of the first internal fitting 60a. Naturally, for overall continuity of the caisson 6, similar reinforcements are provided on the upper angles 50, locally at the level of the passage of the first internal fittings 60*a*, and on the transversal groove 32, as shown hereinabove.

Of course, the person skilled in the art can make various modifications to the aircraft assembly just described, solely by way of non-limiting example. In this respect, it can especially be indicated whether the assembly has been shown in a configuration adapted for the engine to be suspended under the wing of the aircraft, and this assembly could also be in a different configuration allowing it to be mounted above this same wing.

The invention claimed is:

1. An aircraft assembly comprising:
   a wing element forming a caisson and an attachment pylon of a turboengine on the wing element, the attachment pylon comprising a rigid structure forming a caisson defined externally by a first longeron, a second longeron, and two lateral panels arranged on either side of the first and second longerons;
   attachment means of the rigid structure on the wing element, the attachment means being fitted with two front attachments connecting respectively with the two lateral panels, each front attachment comprising two first fittings connecting with the associated lateral panel, at least one second fitting connecting with the wing element, and shackles articulated by one of their ends to the second fitting and articulated by the other end to the two first fittings,
   wherein for each front attachment, the two first fittings are arranged respectively on either side of their associated lateral panel.

2. The aircraft assembly as claimed in claim 1, wherein for each front attachment, the two first fittings respectively constitute a first internal fitting and a first external fitting.

3. The aircraft assembly as claimed in claim 2, wherein the first longeron of the rigid structure forming a caisson is arranged between the two first internal fittings belonging respectively to the two front attachments, and extending from a single piece towards the front and towards the rear from the two front attachments.

4. The aircraft assembly as claimed in claim 3, wherein the first longeron of the rigid structure forming a caisson includes two lateral reinforcements coupled to the two first internal fittings.

5. The aircraft assembly as claimed in claim 2, wherein for each front attachment, the first internal fitting is housed between its associated lateral panel and an internal transversal groove belonging to the rigid structure forming a caisson.

6. The aircraft assembly as claimed in claim 1, wherein for each front attachment, the second fitting is connected with a front longeron of the wing element.

7. The aircraft assembly as claimed in claim 1, wherein the attachment means further comprises an intermediate attachment and a rear attachment.

8. The aircraft assembly as claimed in claim 1, wherein the first longeron constitutes an upper longeron of the caisson.

9. An aircraft comprising at least one aircraft assembly as claimed in claim 1.

* * * * *

UNITED STATES PATENT AND TRADEMARK OFFICE
CERTIFICATE OF CORRECTION

| | |
|---|---|
| PATENT NO. | : 8,167,238 B2 |
| APPLICATION NO. | : 12/596784 |
| DATED | : May 1, 2012 |
| INVENTOR(S) | : Pascal Gardes et al. |

Page 1 of 1

It is certified that error appears in the above-identified patent and that said Letters Patent is hereby corrected as shown below:

On the title page, Item 73, the Assignee's information is incorrect. Item 73 should read:

-- (73) Assignee: Airbus Operations SAS, Toulouse, (FR) --

Signed and Sealed this
Twenty-fourth Day of July, 2012

David J. Kappos
*Director of the United States Patent and Trademark Office*